United States Patent
Melia et al.

(10) Patent No.: US 8,811,995 B2
(45) Date of Patent: Aug. 19, 2014

(54) NOTIFICATION WITHIN A WIRELESS COMMUNICATION NETWORK

(75) Inventors: Telemaco Melia, Nozay (FR); Barbara Orlandi, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/393,916

(22) PCT Filed: Sep. 1, 2010

(86) PCT No.: PCT/EP2010/062817
§ 371 (c)(1),
(2), (4) Date: May 17, 2012

(87) PCT Pub. No.: WO2011/026867
PCT Pub. Date: Mar. 10, 2011

(65) Prior Publication Data
US 2012/0231831 A1   Sep. 13, 2012

(30) Foreign Application Priority Data
Sep. 2, 2009 (FR) .................................. 09 04158

(51) Int. Cl.
*H04W 36/00* (2009.01)
(52) U.S. Cl.
USPC ......... 455/436; 455/456.2; 455/465; 709/223
(58) Field of Classification Search
USPC ................. 455/456.6, 465; 709/223
See application file for complete search history.

(56) References Cited

U.S. PATENT DOCUMENTS

| | | | | |
|---|---|---|---|---|
| 6,055,570 A | * | 4/2000 | Nielsen | 709/224 |
| 2001/0052052 A1 | * | 12/2001 | Peng | 711/133 |
| 2002/0004402 A1 | * | 1/2002 | Suzuki | 455/456 |
| 2002/0010767 A1 | * | 1/2002 | Farrow et al. | 709/223 |
| 2006/0240849 A1 | * | 10/2006 | Suzuki | 455/465 |
| 2012/0087279 A1 | * | 4/2012 | Rinne et al. | 370/254 |

OTHER PUBLICATIONS

"3rd Generation Partnership Project: Technical Specification Group Core Network and Terminals; Access to the 3GPP Evolved Packet Core (EPC); via non-3GPP access networks; Stage 3; (Release 8)," 3GPP TS 24.302 V8.2.0, $3^{rd}$ Generation Partnership Project (3GPP), XP050365261, pp. 1-45, (Jun. 2009).

Motorola, "ANDSF Push Not Mandated in All Access Networks," S2-091499, $3^{rd}$ Generation Partnership Project (3GPP), 3GPP TSG-SSA WG2 Meeting #71, Budapest Hungary, XP050333386, 5 pages, (Feb. 2009).

"Universal Mobile Telecommunications System (UMTS); LTE; Architecture enhancements for non-3GPP access (3GPP TS 23.402 version 8.6.0 Release 8)," Technical Specification, European Telecommunications Standard Institute (ETSI), XP014044537, pp. 1-198, (Jun. 2009).

(Continued)

*Primary Examiner* — Charles Shedrick
(74) *Attorney, Agent, or Firm* — Fay Sharpe LLP

(57) ABSTRACT

Some embodiments of the present invention pertain to a method for notifying at least one mobile device of a wireless communication network about an update to a database, wherein the update notification is transmitted to the mobile devices by means of a dynamic host configuration protocol (DHCP) server.

21 Claims, 2 Drawing Sheets

(56) References Cited

OTHER PUBLICATIONS

Subir Das et al., "Dynamic Host Configuration Protocol (DHCPv4 and DHCPv6) Options for Access Network Discovery and Selection Function (ANDSF) Discovery draft-das-mipshop-andsf-dhcp-options-01," Internet Engineering Task Force (IETF), XP015063380, 9 pages, Jul. 12, 2009.

R. Droms et al., "Dynamic Host Configuration Protocol for IPv6 (DHCPv6)," Internet Engineering Task Force (IETF), XP015009185, pp. 1-101, Jul. 2003.

International Search Report for PCT/EP2010/062817 dated Sep. 23, 2010.

* cited by examiner

NOTIFICATION WITHIN A WIRELESS COMMUNICATION NETWORK

CROSS-REFERENCE TO RELATED APPLICATIONS

This application is a U.S. national filing of PCT/EP2010/062817, filed Sep. 1, 2010, based on FR Patent Application No. 0904158 filed Sep. 2, 2009, the disclosure of which is hereby incorporated by reference hereto in its entirety, and the priority of which is hereby claimed.

FIELD OF THE INVENTION

This invention pertains to the field of wireless communication networks, and more particularly, the sending of notifications to mobile devices of the network.

BACKGROUND

Telecommunications networks continue to evolve, particularly access networks. Thus, in order for the users' mobile devices to take into account these evolutions, these mobile devices must carry out updates from a database.

Additionally, in order to minimize the exchanges with the database, it is preferable for a notification to be sent to the users' mobile devices in order to inform them that the database has been modified.

Nonetheless, in the state of the art, the means that enable a notification to be sent to the users' mobile devices exhibit significant limitations depending on the type of access network being used. In particular, in the Open Mobile Alliance-Device Management (OMA-DM) protocol, one solution consists of using SMS (Short Message System) messages, but this solution is difficult to implement for a LTE (Long Term Evolution) network, and is completely inapplicable for WiMAX (Worldwide Interoperability for Microwave Access) networks.

Another alternative from the state of the art consists of using a TCP (Transmission Control Protocol) connection between the OMA-DM server or the ANDSF (Access Network Discovery and Selection Function) box that manages the database and the mobile devices. However, this solution may cause scalability problems as a result of maintaining many TCP connections, and may thereby affect the entire network's performance.

SUMMARY

Therefore, one object of embodiments of the present invention is to overcome these aforementioned drawbacks from the state of the art and to provide an independent access-technology notification method (whether it is standardized by the 3GPP (Third Generation Partnership Project): GSM/GPRS, UMTS, LTE or by the WMF (WiMAX Forum): WiMAX).

To that end, embodiments of the invention pertain to a method for notifying at least one mobile device of a wireless communication network about an update to a database, wherein the update notification is transmitted to the mobile devices by means of a Dynamic Host Configuration Protocol (DHCP) server.

According to another aspect of embodiments of the present invention, said database contains information about the network enabling at least one of said mobile devices to choose an access network and/or to optimize the handovers (HO).

According to another aspect of embodiments of the present invention, said database is managed by an automatic Access Network Discovery and Selection Function (ANDSF).

According to an additional aspect of embodiments of the present invention, said database uses the protocol defined by the Open Mobile Alliance-Device Management (OMA-D)) to communicate with the mobile devices.

According to an additional aspect of embodiments of the present invention, the method comprises the following steps
editing/updating the database,
sending a notification to the dynamic host configuration protocol server that the database has been edited/updated,
transmitting a reconfiguration message from the dynamic host configuration protocol server to at least one mobile device,
sending an information request from said at least one mobile device to the dynamic host configuration protocol server in response to the reconfiguration message,
sending a reply message from the dynamic host configuration protocol server to said at least one mobile device in response to the information request,
sending an acknowledgment of receipt message to the server managing the database.

According to another aspect of embodiments of the present invention, the reconfiguration message comprises an identifier of at least one mobile device, an identifier of the dynamic host configuration protocol server, an authentication option, and a reconfiguration message type option, the reconfiguration message type field comprising an Information Request.

According to additional aspect of embodiments of the present invention, after the step of transmitting a reconfiguration message from the dynamic host configuration protocol server to at least one mobile device, said at least one mobile device verifies, based on the identifier of the dynamic host configuration protocol server and on the authentication option, that it is communicating with the correct peer in accordance with the DHCP protocol.

According to an additional aspect of embodiments of the present invention, said reply message comprises update information concerning the server managing the database.

According to an additional aspect of embodiments of the present invention, an update notification being received by said at least one mobile device causes said at least one mobile device to connect to the server managing the database.

According to an additional aspect of embodiments of the present invention, the connection of said at least one mobile device to the server managing the database is carried out according to an Open Mobile Alliance-Device Management (OMA-DM) protocol.

Embodiments of the invention also pertain to an Access Network Discovery and Selection Function (ANDSF) server configured for managing a database of access networks and for sending a notification of said database's update to a Dynamic Host Configuration Protocol (DHCP) server.

Embodiments of the invention also pertain to a Dynamic Host Configuration Protocol (DHCP) server configured for receiving a notification of an update to a database managed by an Access Network Discovery and Selection Function (ANDSF) server and for transmitting said update notification to at least one mobile device.

Embodiments of the present invention also pertain to a communication network comprising an Access Network Discovery and Selection Function (ANDSF) server and a Dynamic Host Configuration Protocol (DHCP) server, wherein the updating of a database managed by the ANDSF server is transmitted to at least one mobile device of the network by means of the DHCP server.

BRIEF DESCRIPTION OF THE DRAWINGS

Some embodiments of apparatus and/or methods in accordance with embodiments of the present invention are now described, by way of example only, and with reference to the accompanying drawings, in which.

In the following description, generally:

The term "ANDSF" is an acronym for "Access Network Discovery and Selection Function";

The term "DHCP" is an acronym for "Dynamic Host Configuration Protocol";

The term "OMA-DM" is an acronym for "Open Mobile Alliance-Device Management" and designates the protocol defined by this workgroup within that alliance as well;

The term "IP" is an acronym for "Internet Protocol";

The term "3GPP" is an acronym for "Third Generation Partnership Project";

The term "LTE" is an acronym for "Long Term Evolution".

The term "WiMAX" is an acronym for "Worldwide Interoperability for Microwave Access";

The term "TCP" is an acronym for "Transmission Control Protocol";

DESCRIPTION OF EMBODIMENTS

Figure 1:
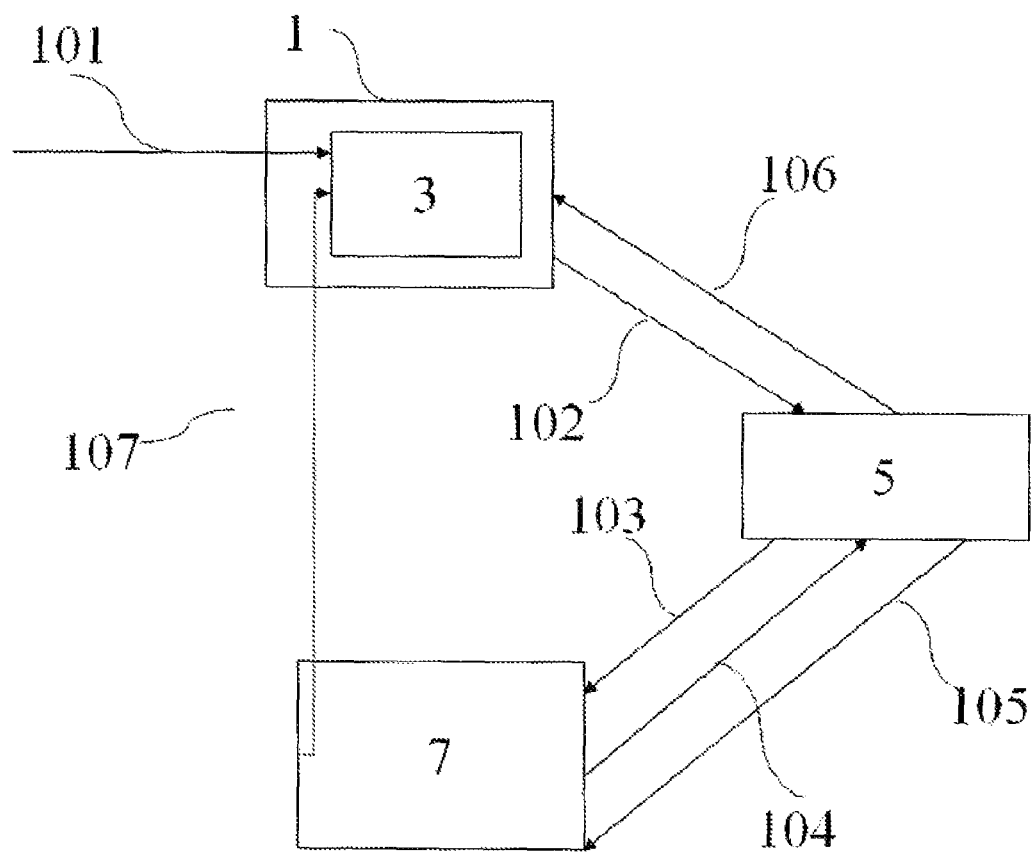
FIG. 1 depicts a diagram of part of a communication network.

Embodiments of the present invention aim to establish a "push" method enabling a telecommunications network to cause the updating of the network's mobile devices by sending notifications to the mobile devices in order to inform them of the availability of updates. FIG. 1 depicts part of a telecommunication network comprising an ANDSF server 1 equipped with a database 3, a DHCP server 5 and a mobile device or DHCP client 7. The database 3 comprising information for the mobile devices. It should be noted that the ANDSF server may be replaced with another type of server using the OMA-DM protocol, so that embodiments of the invention are not limited to the use of an ANDSF server, but rather for any type of server using the OMA-DM protocol.

Figure 2:
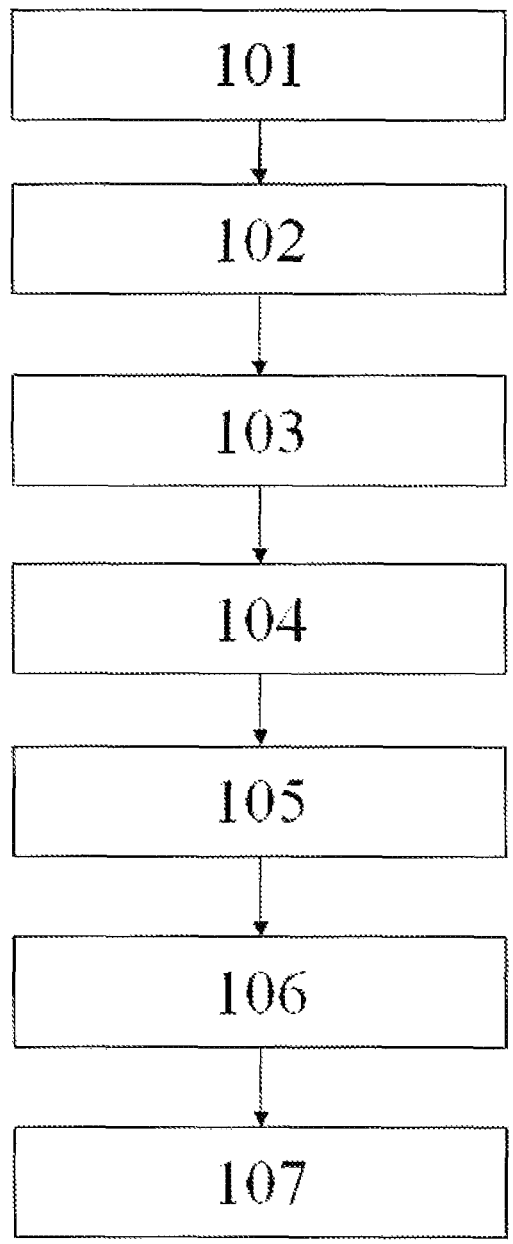
FIG. 2 is a synoptic diagram of various steps of embodiments of the present invention.

FIG. 2 depicts the various steps of a method according to embodiments of the present invention.

The first step 101 corresponds to updating/editing the database 3.

In order to inform the network's mobile devices of that edit/update, the server (ANDSF or type using the OMA-DM protocol) 1 transmits a notification to the DHCP server 5 (step 102). This notification serves to inform the DHCP server 5 of the update to the database 3 so that the server will transmit the information to the network's client 7.

The DHCP server 5 then transmits a reconfiguration message to each DHCP client 7, comprising the identifier of the DHCP client 7, the identifier of the DHCP server 5, the authentication option, and the reconfiguration message type option (step 103) indicating an Information Request.

When the reconfiguration message is received, the DHCP client 7 checks that it is communicating with the correct peer in accordance with the DHCP protocol, and responds to the DHCP server 5 with an information request for the options that the ANDSF/OMA-DM server 1 wishes to update (step 104), The DHCP server 5 then sends back a reply message comprising the updated information regarding the database 3 (step 105), These updates may relate to the neighboring cells and access networks which are available, as well as their priority for the purposes of optimizing the cell handover process.

Furthermore, the DHCP server 5 also sends an acknowledgment of receipt message back to the ANDSF/OMA-DM server 1 in order to inform it of the communication with the DHCP client 7 and concludes the exchange of messages (step 106).

The DHCP client 7 is therefore informed of the availability and nature of the updates to the database 3 and may thereby retrieve these updates by directly contacting the ANDSF/OMA-DM server 1 (step 107). The connection between the DHCP client 7 and the ANDSF/OMA-DM server 1 is done using the OMA-DM communication protocol.

Thus, the various aspects of embodiments of the present method enable the ANDSF/OMA-DM server 1 to trigger a mobile device update procedure so that they can connect to the database 3 of the ANDSF/OMA-DM server 1 and retrieve the corresponding information. By using a method based on an IP infrastructure and employing a well-established DHCP protocol, the embodiments of the present invention offer a solution that may be used by the various types of access networks: not only 3GPP networks such as LTE, but also WiMAX networks, and make it possible to improve the network's performance and reduce scalability problems, such as by making it unnecessary to keep TCP connections active or use trigger SMSs.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for notifying at least one mobile device of a wireless communication network about an update to a database of access networks, wherein the update notification is transmitted to the mobile devices by a dynamic host configuration protocol (DHCP) server and said database is managed by an automatic Access Network Discovery and Selection Function (ANDSF).

2. A notification method according to claim 1, wherein said database contains information about the network making it possible for at least one of said mobile device(s) to choose an access network and/or optimize the handovers.

3. A notification method according to claim 1, wherein said database uses the protocol defined by the Open Mobile Alliance-Device Management (OMA-DM) for communicating with mobile devices.

4. A notification method according to claim 1, further comprising:

receiving a notification at the dynamic host configuration protocol server that the database has been edited/updated, transmitting a reconfiguration message from the dynamic host configuration protocol server to at least one mobile device, receiving an information request from said at least one mobile device at the dynamic host configuration protocol server in response to the reconfiguration message, sending a reply message from the dynamic host configuration protocol server to said at least one mobile device in response to the information request, sending an acknowledgment of receipt message to the server managing the database.

5. A notification method according to claim 4, wherein the reconfiguration message comprises an identifier of at least one mobile device, an identifier of the dynamic host configuration protocol server, an authentication option, and a reconfiguration message type option, the reconfiguration message type field comprising an Information Request.

6. A notification method according to claim 5, wherein after transmitting a reconfiguration message from the dynamic host configuration protocol server to at least one mobile device, said at least one mobile device verifies, based on the identifier of the dynamic host configuration protocol server and on the authentication option, that it is communicating with the correct peer in accordance with the DHCP protocol.

7. A notification method according to claim 4, wherein said reply message comprises update information concerning the server managing the database.

8. A notification method according to claim 1, wherein the update notification being received by said at least one mobile device causes said at least one mobile device to connect to the server managing the database.

9. A notification method according to claim 8, wherein the connection of said at least one mobile device to the server managing the database is carried out according to an Open Mobile Alliance-Device Management (OMA-DM) protocol.

10. An Access Network Discovery and Selection Function (ANDSF) server configured for managing a database of access networks and for sending a notification of said database's update to a Dynamic Host Configuration Protocol (DHCP) server, wherein the DHCP server is configured to transmit a reconfiguration message to at least one mobile device.

11. A Dynamic Host Configuration Protocol (DHCP) server configured for receiving a notification of an update to a database of access networks managed by an Access Network Discovery and Selection Function (ANDSF) server, for transmitting said update notification to at least one mobile device, for transmitting a reconfiguration message to at least one mobile device, for receiving an information request from the at least one mobile device in response to the reconfiguration message, and for sending a reply message to the at least one mobile device in response to the information request.

12. A communication network comprising an Access Network Discovery and Selection Function (ANDSF) server according to claim 10 and a Dynamic Host Configuration Protocol (DHCP) server configured for receiving a notification of an update to a database managed by an Access Network Discovery and Selection Function (ANDSF) server and for transmitting said update notification to at least one mobile device, wherein the updating of a database managed by the ANDSF server is transmitted to at least one mobile device of the network via the DHCP server.

13. A method of notifying at least one mobile device of a wireless communication network about an update to a database, the method comprising:

receiving a notification at a dynamic host configuration protocol (DHCP) server that a database has been edited/updated, transmitting a reconfiguration message from the dynamic host configuration protocol server to at least one mobile device, receiving an information request from said at least one mobile device at the dynamic host configuration protocol server in response to the reconfiguration message, sending a reply message from the dynamic host configuration protocol server to said at least one mobile device in response to the information request, sending an acknowledgment of receipt message to the server managing the database.

14. A notification method according to claim 13, wherein said database contains information about the network makes it possible for at least one of said mobile device(s) to choose an access network and/or optimize the handovers.

15. A notification method according to claim 13, wherein said database uses the protocol defined by the Open Mobile Alliance-Device Management (OMA-DM) for communicating with mobile devices.

16. A notification method according to claim 13, wherein the reconfiguration message comprises an identifier of at least one mobile device, an identifier of the dynamic host configuration protocol server, an authentication option, and a reconfiguration message type option, the reconfiguration message type field comprising an Information Request.

17. A notification method according to claim 16, wherein the reconfiguration message from the dynamic host configuration protocol server to at least one mobile device causes said at least one mobile device to verify, based on the identifier of the dynamic host configuration protocol server and on the authentication option, that it is communicating with the correct peer in accordance with the DHCP protocol.

18. A notification method according to claim 13, wherein said reply message comprises update information concerning the server managing the database.

19. A notification method according to claim 13, wherein the update notification being received by said at least one mobile device causes said at least one mobile device to connect to the server managing the database.

20. A notification method according to claim 19, wherein the connection of said at least one mobile device to the server managing the database is carried out according to an Open Mobile Alliance-Device Management (OMA-DM) protocol.

21. A mobile device configured for receiving from a Dynamic Host Configuration Protocol (DHCP) server a notification of an update to a database for access networks managed by an Access Network Discovery and Selection (ANDSF) server and for receiving from the DHCP server a reconfiguration message.

* * * * *